UNITED STATES PATENT OFFICE.

LOUIS BOUDREAUX, OF PARIS, FRANCE.

METHOD OF MANUFACTURING PRINTING-BLOCKS IN COPPER, NICKEL, &c.

SPECIFICATION forming part of Letters Patent No. 608,248, dated August 2, 1898.

Application filed July 15, 1895. Serial No. 556,076. (No specimens.) Patented in France March 9, 1895, No. 245,674.

*To all whom it may concern:*

Be it known that I, LOUIS BOUDREAUX, a citizen of the Republic of France, residing at Paris, in the Republic of France, have invented a certain new and useful Improvement in the Manufacture of Printing-Blocks in Copper, Nickel, &c., (for which I have obtained Letters Patent in France, No. 245,674, dated March 9, 1895,) of which the following is a specification.

Galvanoplastic reproductions for printing are generally made from impressions in wax, gutta-percha, or some other plastic matter, the surface of which is made a conductor by coating it with pulverized graphite or plumbago.

As regards more especially galvanoplastic reproductions in nickel, the small amount of adhesion of this metal to the coating of plumbago often causes the nickel to detach itself from the impressions. In order to remedy this serious drawback, I have conceived the idea of metallizing the surface of the wax or other plastic material before the impression is made instead of coating it in the ordinary manner with a coating of graphite or plumbago after the mold has been made. In order to metallize these surfaces of plastic material, I may employ all suitably-pulverized metals. Practically I apply a coating of pulverized bronze on the surface of the wax plates before the taking of the impression. The bronzing of the wax plates may be effected in various ways. The important thing is to make the powdered bronze adhere as perfectly as possible. This is easily done by rubbing the surface of the wax by means of suitable brushes impregnated with the powdered bronze. A more perfect result is obtained by sprinkling the wax surface with the powdered bronze, but with the essential condition that this operation must be performed immediately after the casting of the wax plate, before its solidification. The tenacity of the powdered bronze is so great that the grains of this powder remaining on the surface of the liquid wax establish themselves thereon and almost instantaneously cover the whole surface without interruption. When the wax has become solid by cooling, the excess of powdered bronze may be easily removed by any suitable means. The plates of wax or any other plastic matter thus metallized are then applied by pressure to the objects to be molded by following the molding processes suitable to the materials employed.

In order to fix the metallic powders on the surfaces of plastic substances which become soft without melting—as, for example, gutta-percha—these surfaces must be previously heated. The same result may be attained by means of repeated friction by using harder brushes than for wax. The heat developed by this friction will make the gutta-percha adhesive and insure the perfect fixing of the powdered metals. The metallic powders may also be made to adhere to the surfaces of all plastic substances by coating the latter with a suitable solvent—as benzene, ether, bisulfid of carbon, &c.—capable of dissolving the plastic material without exercising any action on the metal powder and then projecting the said metallic powders onto the surfaces thus prepared. After evaporation the excess of powder is removed by any suitable means.

It follows from the experiments made with a view to obtaining this patent that as regards more especially nickel the adhesion of this metal to the metallic coating obtained in the manner above set forth is sufficiently great to prevent it from becoming detached from the impression. Furthermore, a surface of wax or any other plastic matter thus metallized is a much better conductor than a plumbago surface, and any metal, whether nickel or other kind, deposits itself thereon with greater rapidity.

I claim—

The herein-described method of forming molds for use in obtaining galvanoplastic reproductions for printing purposes, which consists in applying a solvent to the surface of the plastic block, sprinkling or coating said surface while in a soft state with metallic powder, removing superfluous powder when dry, and pressing the metallized block upon the etching or object to be reproduced.

In testimony whereof I have hereunto set my hand in the presence of the two subscribing witnesses.

LOUIS BOUDREAUX.

Witnesses:
LOUIS SALLÉGER,
CLYDE SHROPSHIRE.